(12) United States Patent
Itou

(10) Patent No.: US 6,823,758 B2
(45) Date of Patent: Nov. 30, 2004

(54) BICYCLE BRAKE DEVICE

(75) Inventor: Minoru Itou, Toyoura-gun (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/678,819

(22) Filed: Oct. 2, 2003

(65) Prior Publication Data

US 2004/0084254 A1 May 6, 2004

Related U.S. Application Data

(62) Division of application No. 10/033,022, filed on Dec. 26, 2001.

(30) Foreign Application Priority Data

Dec. 27, 2000 (JP) ........................................ 2000-398491

(51) Int. Cl.[7] .............................. F16C 1/00; G01D 5/00
(52) U.S. Cl. ...................... 74/502.4; 74/502.6; 116/283
(58) Field of Search ............................ 74/502.2, 502.6, 74/502.4, 502.5; 116/281, 283, 306, 321, 323, 324

(56) References Cited

U.S. PATENT DOCUMENTS

| | | |
|---|---|---|
| 4,066,147 A | 1/1978 | Toyomoto |
| 4,351,418 A | 9/1982 | Woodring et al. |

(List continued on next page.)

FOREIGN PATENT DOCUMENTS

| | | |
|---|---|---|
| DE | 3613591 A1 | 10/1986 |
| EP | 547795 A2 | 6/1993 |

(List continued on next page.)

OTHER PUBLICATIONS

Patent Abstracts of Japan, vol. 2000, No. 12, Jan. 3, 2001; for JP 2002-238686, published Sep. 5, 2000.

*Primary Examiner*—Thomas Williams
(74) *Attorney, Agent, or Firm*—James A. Deland

(57) ABSTRACT

A cable connecting apparatus for a control cable having an inner wire that slides within an outer casing includes a cable sleeve adapted to receive the outer casing of the control cable; a guide having a first end portion and a second end portion, wherein the guide supports the cable sleeve so that the cable sleeve moves toward the first end portion and the second end portion; and a biasing device for biasing the cable sleeve toward the second end portion of the guide. A connecting apparatus for a first control cable having a first inner wire that slides within a first outer casing and a second outer casing and a second control cable having a second inner wire that slides within a third outer casing and a fourth outer casing includes a bracket including a first support for supporting the first outer casing; a second support for supporting the second outer casing spaced apart from the first outer casing; a third support for supporting the third outer casing; and a fourth support for supporting the fourth outer casing spaced apart from the third outer casing. A connecting member is provided for connecting a portion of the first inner wire located between the first outer casing and the second outer casing to a portion of the second inner wire disposed between the third outer casing and the fourth outer casing, wherein the connector moves together with the first inner wire and the second inner wire. A position confirmation means is provided that allows the position of at least one of the first outer casing, the second outer casing, the third outer casing and the fourth outer casing to be visually confirmed.

3 Claims, 10 Drawing Sheets

U.S. PATENT DOCUMENTS

| | | | | |
|---|---|---|---|---|
| 4,693,137 A | | 9/1987 | Deligny | |
| 4,823,915 A | | 4/1989 | Nagano | |
| 4,833,937 A | | 5/1989 | Nagano | |
| 4,862,999 A | | 9/1989 | Rakover | |
| 4,892,004 A | | 1/1990 | Segura et al. | |
| 5,144,856 A | | 9/1992 | Roca | |
| 5,289,794 A | * | 3/1994 | Jerro et al. | 116/281 |
| 5,535,855 A | | 7/1996 | Hanada | |
| 5,765,446 A | | 6/1998 | Patterson et al. | |
| 5,809,840 A | | 9/1998 | Oda et al. | |
| 5,927,442 A | | 7/1999 | Liao | |
| 6,152,266 A | * | 11/2000 | Takizawa | 74/502.2 |
| 6,328,138 B1 | | 12/2001 | Takizawa | |
| 6,370,981 B2 | * | 4/2002 | Watarai | 74/502.2 |
| 6,647,824 B2 | * | 11/2003 | Watarai | 74/502.2 |

FOREIGN PATENT DOCUMENTS

| | | |
|---|---|---|
| EP | 639495 A1 | 2/1995 |
| EP | 647556 A2 | 4/1995 |
| EP | 820926 A2 | 1/1996 |
| EP | 1029780 A2 | 8/2000 |
| EP | 1035008 A2 | 9/2000 |
| EP | 1035009 A2 | 9/2000 |
| JP | 53-69341 A | 6/1978 |
| JP | 54-113143 A | 9/1979 |
| JP | 59-199384 | 11/1984 |
| JP | 1-202594 | 8/1989 |
| JP | 4-2588 | 1/1992 |
| JP | 5-16862 | 1/1993 |
| JP | 5-16863 | 1/1993 |
| JP | 5-16868 | 1/1993 |
| JP | 9-48383 | 2/1997 |

* cited by examiner

BICYCLE BRAKE DEVICE

CROSS REFERENCE TO RELATED APPLICATIONS

This application is a division of copending application Ser. No. 10/033,022, filed Dec. 26, 2001.

BACKGROUND OF THE INVENTION

The present invention is directed to bicycle brake devices and, more particularly, to a bicycle brake cable retainer, a bicycle brake lever assembly, a bicycle brake cable connector, and a bicycle brake system.

A bicycle brake system commonly comprises front and rear braking devices for applying braking forces to the front and rear wheels, front and rear brake levers mounted on the handlebar and designed to operate the front and rear braking devices, and brake cables secured to the front and rear braking devices and to the front and rear brake levers. Each brake cable comprises an inner wire that slides within an outer casing, wherein the inner wire is connected at one end to the brake lever and at the other end to the braking device. The outer casing ordinarily has one end mounted to a bracket for the brake lever and another end mounted to a bracket for the braking device.

The braking device comprises a braked member that rotates with the wheel and a braking member capable of coming into contact with the braked member. The braked member usually is the rim or hub of the wheel. The braking device for applying the braking force to a wheel rim may be a caliper brake or a cantilever brake, whereas the braking device for applying the braking force to a wheel hub may be an internal expanding brake in the form of a band brake, disk brake, roller brake, or the like. The braking device usually includes a play adjusting mechanism for adjusting the gap between the braked member and the braking member (that is, the play of the braking device) when the brake lever is not being operated. In a typical mechanism, an outer retainer for securing the outer casing is screwed into the braking device, the retention position of the outer casing is shifted in the axial direction of the cable by the rotation of the outer retainer, and the play is thus adjusted. This operation also sets the brake timing of the braking device.

A cable connector that allows the front and rear braking devices to be operated simultaneously with a single brake lever is disclosed in JP (Kokai) 4-2588, for example. In that device, the cable connector is disposed in the middle of the front and rear brake cables. The cable connector has a connection member for connecting exposed portions of the inner wires of the front and rear brake cables together and a bracket that allows the connection member to move. Outer retainers for securing the portions of the outer casings extending toward the braking devices and the portions of the outer casings extending toward the brake levers are disposed at opposite ends of the bracket. In a brake system having such a cable connector, both inner cables are pulled when a single brake lever is actuated, thus making it possible to obtain enhanced frame stability and stabilized braking characteristics. In addition, braking can be accomplished by operating either the left or right brake lever, thus making it possible to operate the brake levers with ease and to increase the service life of the braking devices by dispersing the braking force.

Since both inner cables are pulled when a single brake lever is actuated in such a system, the inner cable secured to the unactuated brake lever extends further from the outer casing, sags, and causes the brake lever to become loose. Furthermore, since the front and rear inner cables move simultaneously, the front and rear brake timing may vary considerably if the play is markedly different for each braking device. Since the inner cable connected to the rear braking device is longer than the one connected to the front braking device, it tends to stretch more during use. As a result, the rear brake timing gradually shifts away from the initial timing during use, thus making it necessary to readjust the amounts of play for the front and rear braking devices.

Optimally, the play of the front and rear braking devices should be kept the same or be limited to a specific difference. In a conventional braking device in which braking force is applied to the rim, the play can be kept constant by equalizing the gap between the brake shoe and the rim for the front and back wheels. In practice, however, this is difficult to do. In systems in which braking force is applied to the wheel hub, the braking member brought into contact with the drum is disposed inside the braking device, thus making it impossible to see the gap formed between the braking member and the hub. This makes it even more difficult to provide the front and back braking devices with the desired amounts of play.

SUMMARY OF THE INVENTION

The present invention is directed to an apparatus that can be used to simplify the adjustment of brake play and/or minimize looseness of the brake cable. In one embodiment of an invention directed to a cable connecting apparatus for a control cable having an inner wire that slides within an outer casing, the cable connecting apparatus includes a cable sleeve adapted to receive the outer casing of the control cable; a guide having a first end portion and a second end portion, wherein the guide supports the cable sleeve so that the cable sleeve moves toward the first end portion and the second end portion; and a biasing device for biasing the cable sleeve toward the second end portion of the guide. This allows slack to be taken up in a brake cable attached, for example, to a brake lever in a system wherein the front and rear cables are connected together for simultaneous operation.

In an embodiment of an invention directed to an indicating apparatus for a control cable having an inner wire that slides within an outer casing, the indicating apparatus includes a guide adapted to receive the outer casing of the control cable, an indicator adapted to be retained to the outer casing of the control cable, and a window for viewing the indicator. In another embodiment of an invention directed to an indicating apparatus for a control cable having an inner wire that slides within an outer casing, the indicating apparatus includes a guide adapted to receive the outer casing of the control cable, an indicator adapted to be retained to the outer casing of the control cable, and indicia supported by the guide for cooperating with the indicator to indicate a position of the outer casing of the control cable.

In an embodiment of an invention directed to a connecting apparatus for a first control cable having a first inner wire that slides within a first outer casing and a second outer casing and a second control cable having a second inner wire that slides within a third outer casing and a fourth outer casing, the apparatus includes a bracket including a first support for supporting the first outer casing, a second support for supporting the second outer casing, a third support for supporting the third outer casing, and a fourth support for supporting the fourth outer casing. A connecting member is provided for connecting a portion of the first inner wire located between the first outer casing and the second outer casing to a portion of the second inner wire disposed between the third outer casing and the fourth outer casing, wherein the connector moves together with the first inner wire and the second inner wire. A position confirmation means is provided that allows the position of at least one of the first outer casing, the second outer casing, the third outer casing and the fourth outer casing to be visually confirmed.

DETAILED DESCRIPTION OF THE EMBODIMENTS

Figure 1:
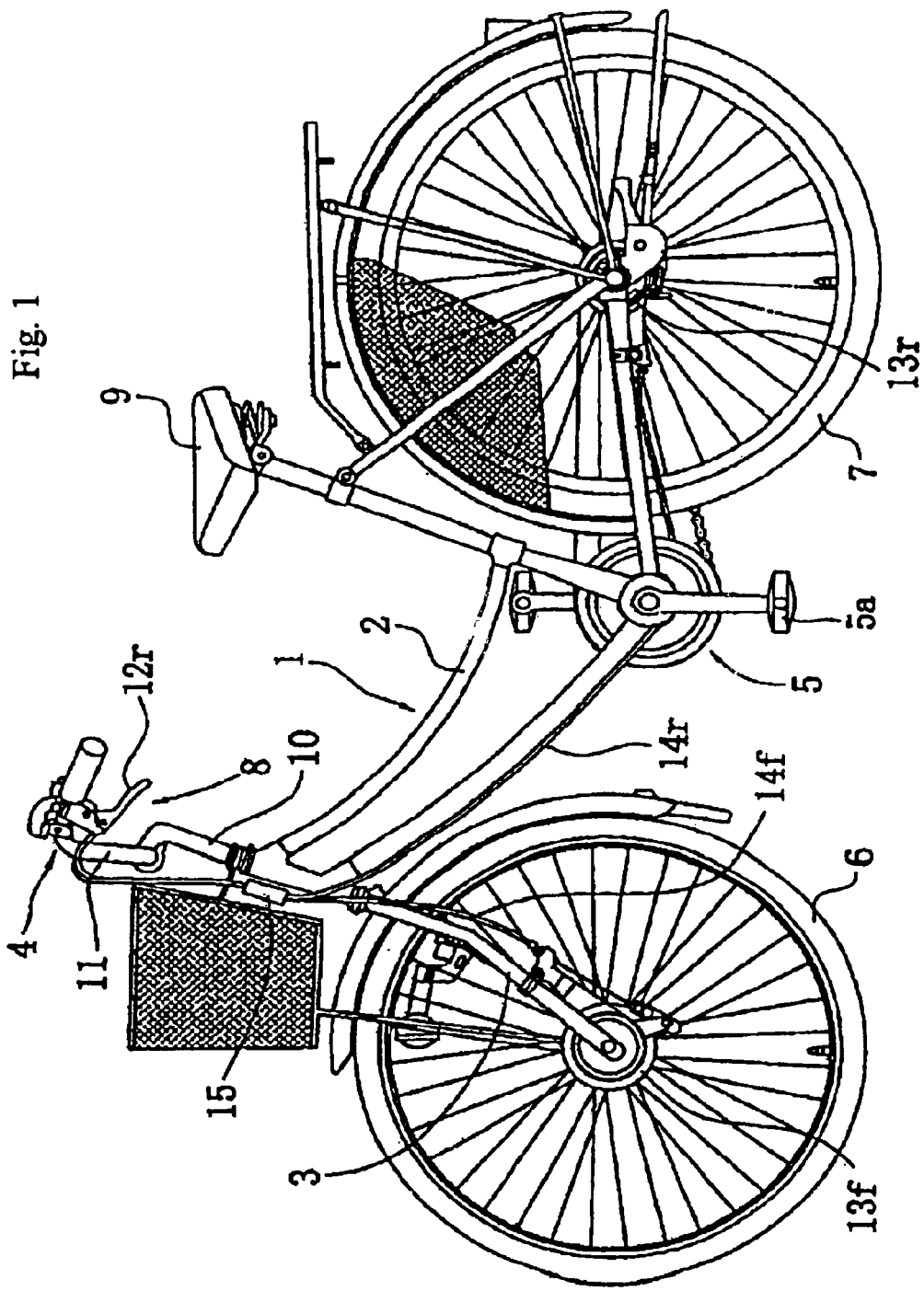
FIG. 1 is a side view of a bicycle that incorporates a particular embodiment of a braking apparatus according to the present invention.

FIG. 1 is a side view of a bicycle that incorporates a particular embodiment of a braking apparatus according to the present invention. In this embodiment, the bicycle is a touring bicycle comprising a frame 1 with a double-loop frame body 2 and a front fork 3, a handle assembly 4 for steering, a drive unit 5 for transmitting the rotation of pedals 5a to a rear wheel 7, a front wheel 6, and a brake system 8 for braking the front and rear wheels 6 and 7. The handle assembly 4 comprises a handle stem 10 fixedly mounted in the upper portion of the front fork 3 and a handlebar 11 fixedly mounted on the handle stem 10. The handle assembly 4, drive unit 5, front wheel 6, rear wheel 7, and brake system 8 are mounted together with a saddle 9 and other components on the frame 1.

Figure 2:
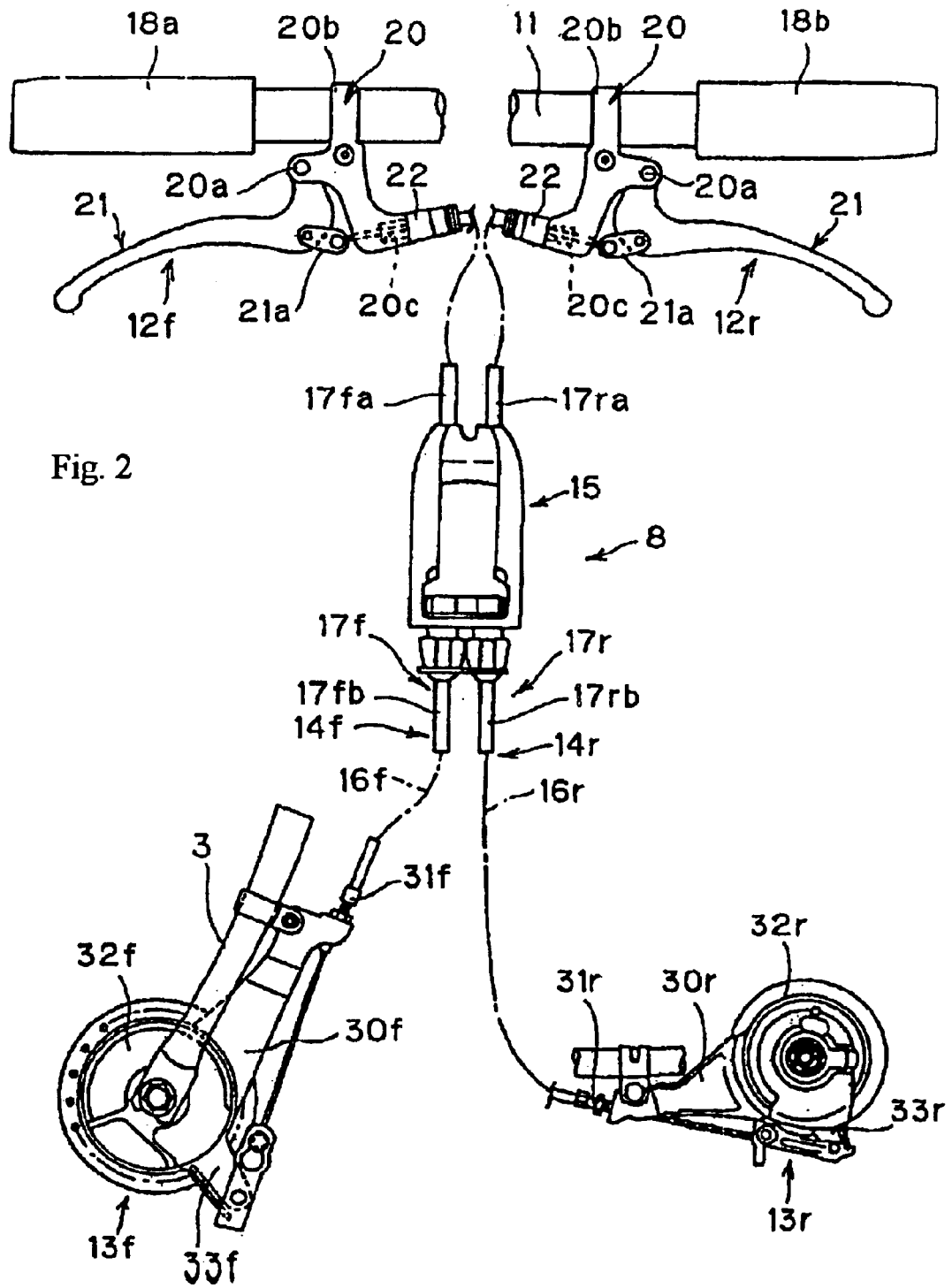
FIG. 2 is a detailed view of the braking apparatus.

As shown in FIG. 2, the brake system 8 comprises front and rear brake levers 12$f$ and 12$r$, braking devices 13$f$ and 13$r$ actuated by the front and rear brake levers 12$f$ and 12$r$, front and rear brake cables 14$f$ and 14$r$ connected between the front and rear brake levers 12$f$ and 12$r$ and the front and rear braking devices 13$f$ and 13$r$, and a cable connector 15 for connecting the front and rear brake cables 14$f$ and 14$r$ in a manner described below. The brake cables 14$f$ and 14$r$ comprise inner cables 16$f$ and 16$r$ connected at both ends to the brake levers 12$f$ and 12$r$ and to the braking devices 13$f$ and 13$r$, and outer casings 17$f$ and 17$r$ for covering the inner cables 16$f$ and 16$r$. The outer casings 17$f$ and 17$r$ are divided by the cable connector 15 into the outer casings 17$fa$ and 17$ra$ extending from cable connector 15 toward the brake levers 12$f$ and 12$r$, and the outer casings 17$fb$ and 17$rb$ extending from cable connector 15 toward the braking devices 13$f$ and 13$r$.

The front brake lever 12$f$ is mounted inwardly from a grip 18$a$ attached to the left end of the handlebar 11, and the rear brake lever 12$r$ is mounted inwardly from a grip 18$b$ attached to the right end of the handlebar 11. The brake levers 12$f$ and 12$r$ are mirror images of each other. The brake levers 12$f$ and 12$r$ each comprise a lever bracket 20 mounted on the handlebar 11, a lever member 21 pivotably supported by the lever bracket 20, and an outer retainer 22 fixedly screwed into the lever bracket 20.

Each lever bracket 20 comprises a rocking shaft 20$a$ for pivotably supporting the lever member 21, a mounting component 20$b$ detachably mountable on the handlebar 11, and an internally threaded component 20$c$ capable of threadably accepting the outer retainer 22 and receiving the inner cables 16$f$ and 16$r$ therethrough. Each lever member 21 is biased by a biasing member (not shown) in the direction of brake release, and each lever member 21 has an inner retainer 21$a$ for securing the inner cables 16$f$ and 16$r$ of the brake cables 14$f$ and 14$r$.

Figure 4:
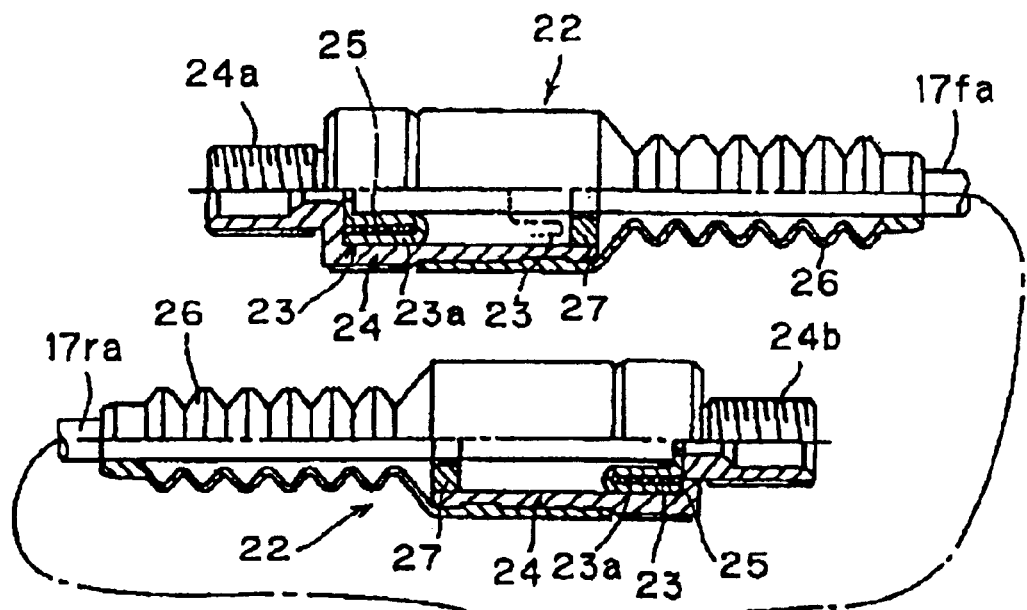
FIG. 4 shows partial cross sectional views of the outer retainers and cable connector shown in FIG. 2.
Figure 4:
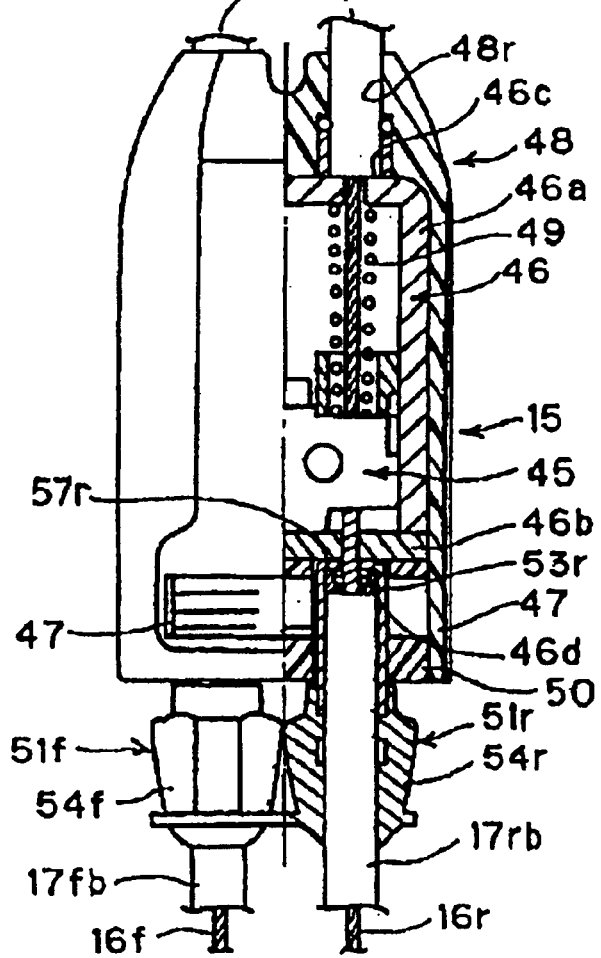

As shown in FIG. 4, each outer retainer 22 comprises a cable sleeve 23, a guide 24, a coil spring 25, and a cable cover 26. The guide 24 is a cylindrical member whose tip is provided with an externally threaded portion 24$a$ for detachable threaded engagement with the internally threaded component 20$c$ of a conventional lever bracket 20. Such a structure makes it easy to remove and/or repair outer retainer 22. The cable sleeve 23 is a perforated cup-shaped member capable of securing the tips of the outer casings 17$fa$ or 17$ra$, and it has on the external periphery thereof a spring sleeve 23$a$ that is folded near the opening. Guide 24 is designed to support the cable sleeve 23 on the internal peripheral surface thereof while allowing cable sleeve 23 to move a predetermined distance along the axis of the brake cables 14$f$ and 14$r$. The coil spring 25, disposed in compressed form between the tip of guide 24 and the spring sleeve 23$a$ of cable sleeve 23, biases the cable sleeve 23 toward the base end (cable insertion side) of guide 24. The base end of guide 24 opens to allow the passage of the cable sleeve 23, and an annular lid member 27 made of metal and capable of accommodating the outer casings 17$fa$ and 17$ra$ therein is fixedly mounted in the opening by press fitting. The cable sleeve 23 is thus retained inside guide 24 against the biasing force of the coil spring 25. Cable sleeve 23 is moved toward the tip of guide 24 (toward the brake lever) against the biasing force of the coil spring 25 when the inner cables 16$f$ and 16$r$ of the brake cables 14$f$ and 14$r$ are pulled, and the cable sleeve 23 is moved toward the base end of guide 24 (toward the lid member 27) by the coil spring 25 when the inner cables 16$f$ and 16$r$ are released from tension, as shown by the chain line in FIG. 4. The cable cover 26, which is a contractible bellows member made of an elastic material, sealingly covers the external peripheral surfaces of the guide 24 and the outer casings 17$fa$ and 17$ra$ to prevent the entry of water or other contaminants to prevent freezing or corrosion of the components.

Figure 3A:
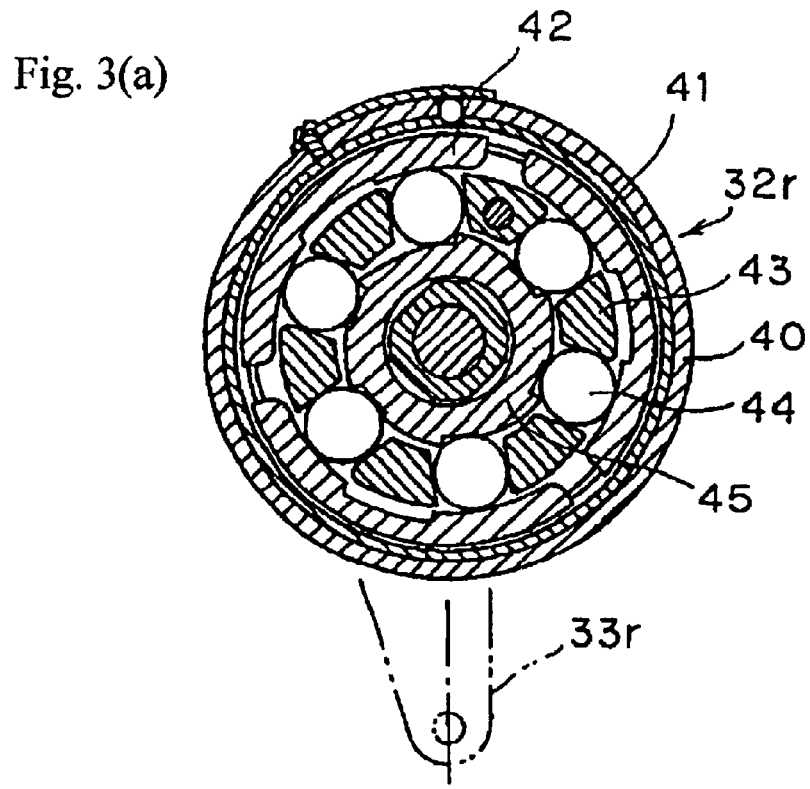
FIGS. 3(a) and 3(b) are views illustrating the operation of a braking device shown in FIG. 2.
Figure 3B:
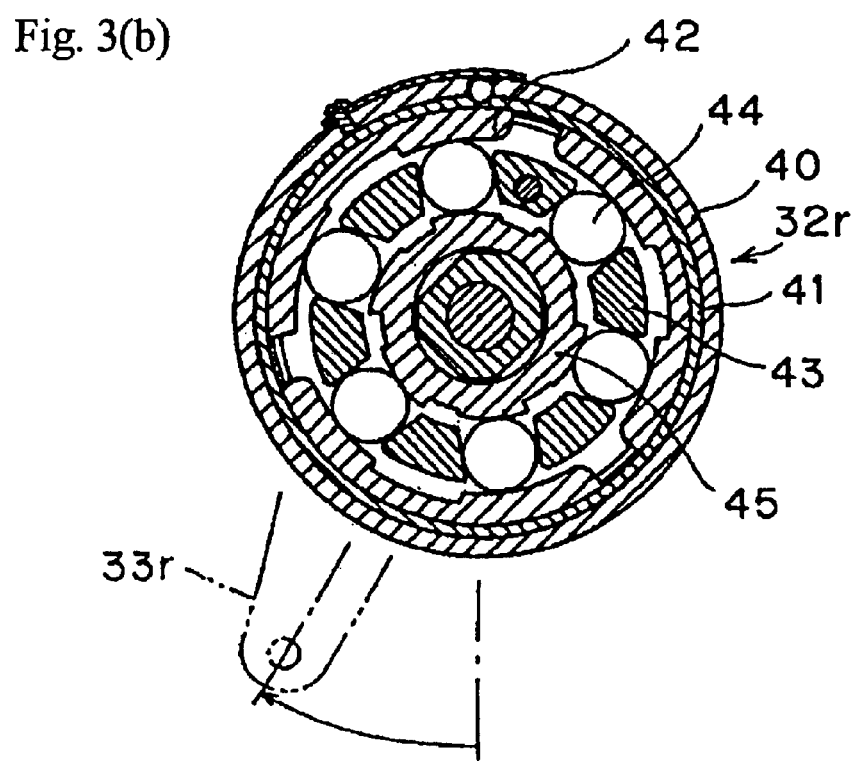

As shown in FIGS. 2, 3(a) and 3(b), the front and rear braking devices 13$f$ and 13$r$ are roller-type internal expanding brakes. The braking devices 13$f$ and 13$r$ comprise fixed brackets 30$f$ and 30$r$ fixedly mounted to the back portions of the bicycle front fork 3 and frame body 2, play adjusting components 31$f$ and 31$r$ for securing the outer casings 17$fb$ and 17$rb$ and adjusting the play of the braking devices 13$f$ and 13$r$, brake bodies 32$f$ and 32$r$, and brake operating arms 33$f$ and 33$r$ that can pivot relative to the brake bodies 32$f$ and 32r. The play adjusting components 31f and 31r are provided with outer retainers screwed into the fixed brackets 30f and 30r, thus allowing the play of the braking devices 13f and 13r to be adjusted by moving the end positions of the outer casings 17fb and 17rb back and forth in the axial direction.

The brake bodies 32f and 32r have substantially the same structure, so the rear brake body 32r alone will be described herein. As shown in FIGS. 3(a) and 3(b), the rear brake body 32r comprises a rotary component 40 that rotates integrally with the hub shell of the rear wheel 7, a brake drum (braked member) 41 fixedly mounted on the internal peripheral surface of the rotary component 40, and brake shoes (braking members) 42 capable of coming into contact with and disengaging from the brake drum 41. The brake shoes 42 are brought into contact with the brake drum 41 for applying a braking force to the rear wheel 7 when a plurality of rollers 44 supported by a roller case 43 are moved radially outward by the rotation of a rotary cam 45. The rotary cam 45 rotates in conjunction with the brake operating arm 33r, wherein the inner cable 16r is secured to the brake operating arm 33r. Thus, pulling the inner cable 16r by gripping the brake lever 12r will cause the brake operating arm 33r to rotate clockwise from the brake release position shown in FIG. 3(a) to the braking position shown in FIG. 3(b). This, in turn, causes the brake shoes 42 to come into contact with the brake drum 41 and apply a braking force to the rear wheel 7. The gap formed between the brake shoes 42 and the brake drum 41 during brake release constitutes the play of the braking device 13r.

Figure 5:
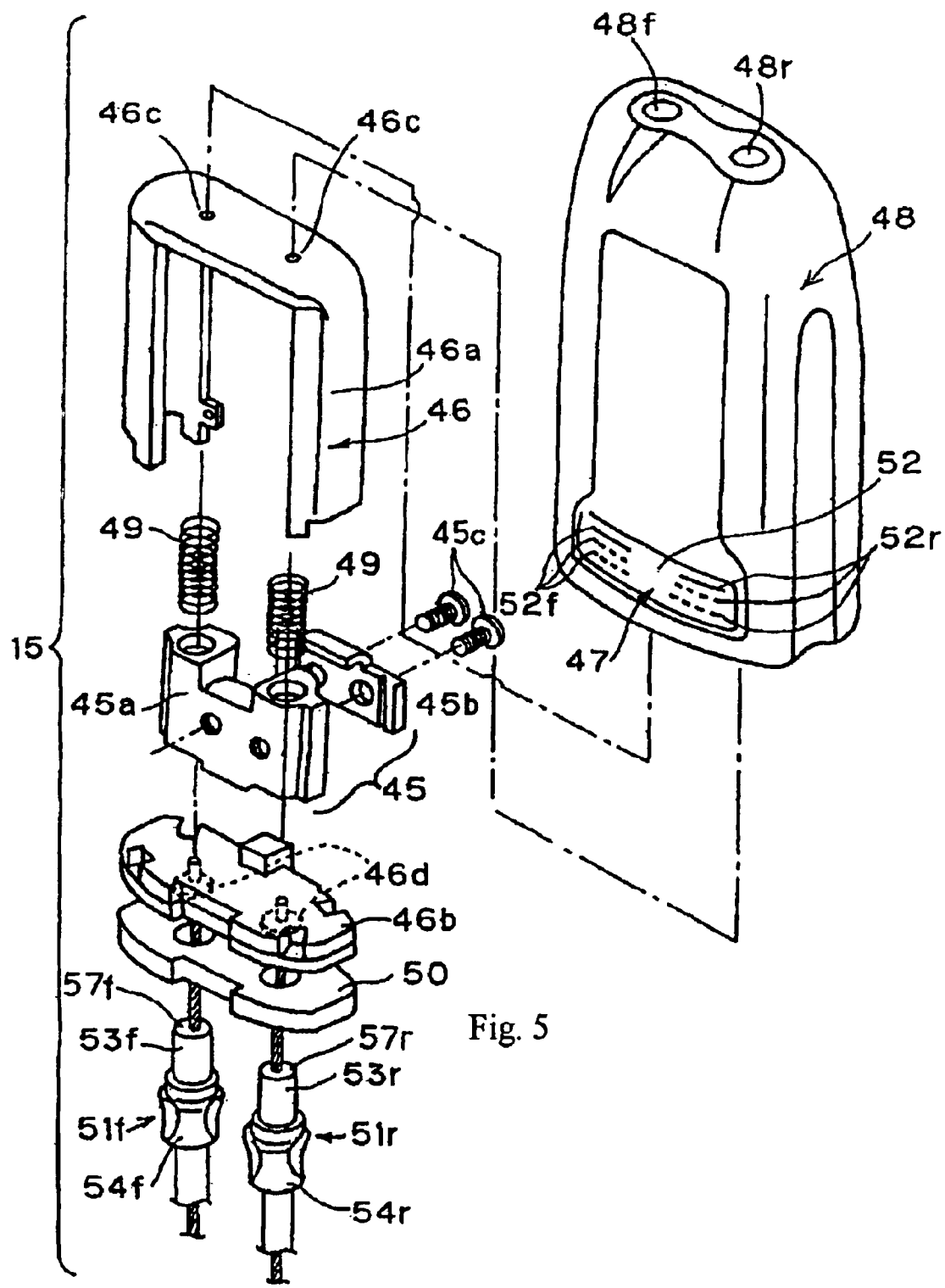
FIG. 5 is an exploded view of the cable connector shown in FIG. 2.
Figure 6:
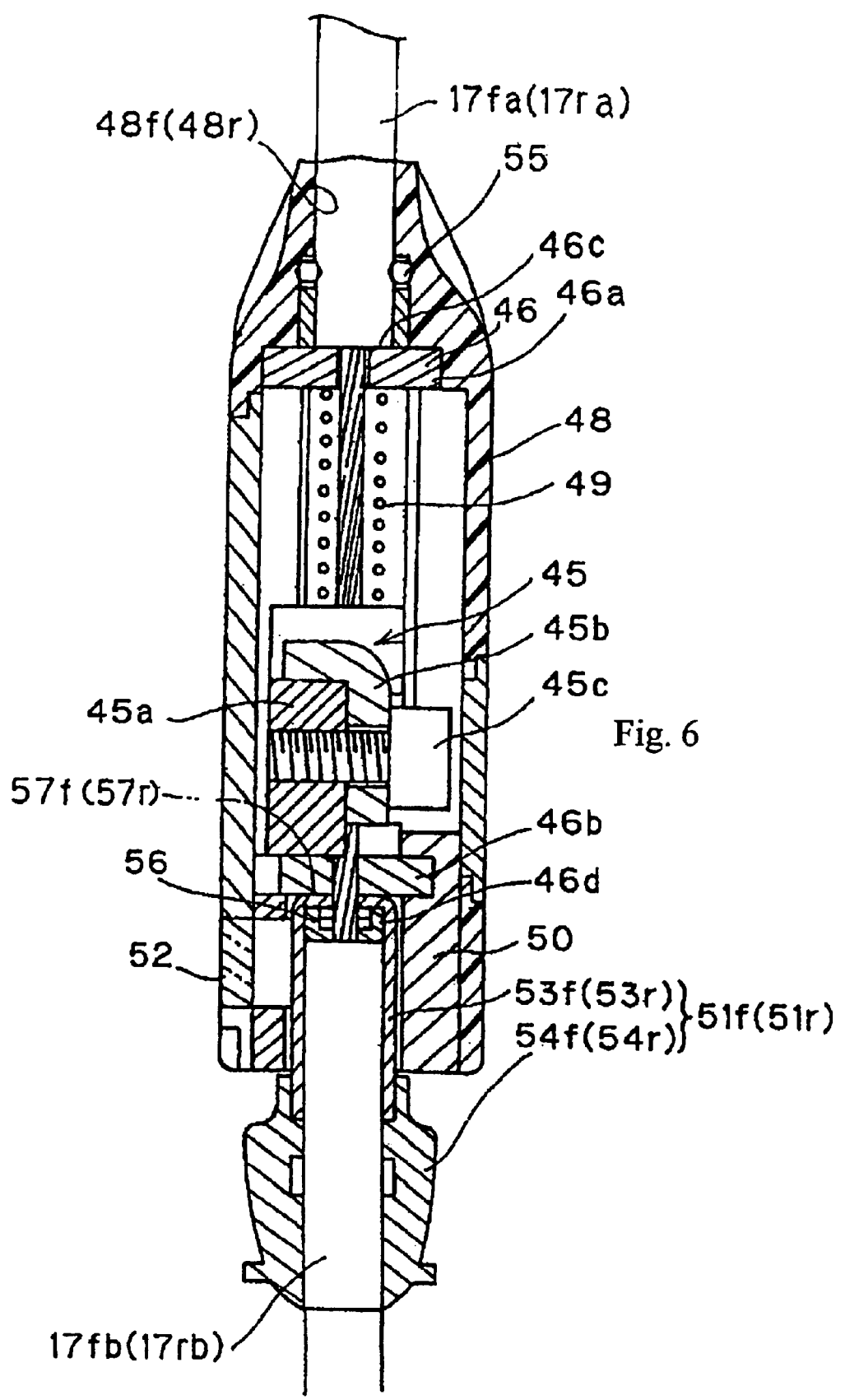
FIG. 6 is a detailed cross sectional view of the cable connector shown in FIG. 2.

The cable connector 15 is a device for connecting the front and rear brake cables 14f and 14r together so that both the front and rear braking devices 13f and 13r may be actuated by operating either one of the front and rear brake levers 12f and 12r. As shown in FIGS. 4-6, the cable connector 15 comprises a connection member 45 for connecting the inner cables 16f and 16r of the front and rear brake cables 14f and 14r together, a bracket 46 for housing the connection member 45, a play confirmation component 47 that allows the play of the front and rear braking devices 13f and 13r to be confirmed visually, and a casing 48 for covering the bracket 46.

The connection member 45 is movably mounted inside the bracket 46 and comprises a first connector 45a connected by screws 45c to a second connector 45b. The front and rear inner cables 16f and 16r are connected together by the insertion of the two cables 16f and 16r between the two connectors 45a and 45b. The connection member 45 is biased by two coil springs 49 in the direction of the braking devices 13f and 13r. Such biasing aids the initial setting of connection member 45.

The bracket 46 comprises a bracket body 46a formed of metal and press-molded into a substantial U shape, and a bottom plate component 46b mounted over the open portion of the bracket body 46a. The central portion of the bracket body 46a is provided with outer retainers 46c for securing the outer casings 17fa and 17ra on the side of the brake levers 12f and 12r. The bottom plate component 46b, which is disposed opposite the central portion, is provided with outer retainers 46d designed to secure the outer casings 17fb and 17rb on the side of the braking devices 13f and 13r. A guide 50 is disposed in contact with the lower surface of the bottom plate component 46b. Guide 50 allows confirmation knobs 51f and 51r to be supported while allowing movement of confirmation knobs 51f and 51r in the axial direction. A casing 48 is mounted to cover the bracket 46 and the guide 50, and a transparent indicator window 52 with the graduation marks 52f and 52r is provided to the casing 48. The upper end of the casing 48 is closed while the lower end is blocked by the guide 50. The upper end of the casing 48 is provided with through holes 48f and 48r for accommodating the outer casings 17fa and 17ra. The outer casings 17fa and 17ra are sealed with an O-ring 55 (FIG. 6) around the through holes 48f and 48r to prevent liquids from penetrating inside.

The confirmation knobs 51f and 51r comprise cup-shaped indicators 53f and 53r and knob components 54f and 54r. The inner cables 16f and 16r are sealed with a seal ring 56 mounted inside the indicators 53f and 53r. Indicators 53f and 53r are made readily visible by being colored, for example, red or yellow, and they are fixed by crimping to the tips of the outer casings 17fb and 17rb. Guide 50 movably guides the indicators 53f and 53r. Thus, the play of the braking devices 13f and 13r can be visually confirmed by determining the position occupied by the end portions 57f and 57r of the indicators 53f and 53r in relation to the graduation marks 52f and 52r when the outer casings 17fb and 17rb are pulled toward the braking devices 13f and 13r.

When the brake cables 14f and 14r are set, the inner cables 16f and 16r are in a retracted state, so the cable sleeves 23 are moved by the outer casings 17fa and 17ra toward the brake lever against the biasing force of the corresponding coil springs 25. When one of the front and rear brake levers 12f and 12r (for example, the rear brake lever 12r) is operated, the inner cable 16r is pulled, and the rear braking device 13r experiences a braking force. The inner cable 16f, which is connected to the inner cable 16r by connection member 45, also is pulled, thus causing the braking device 13f to experience a braking force as well. However, at this time no tension is applied to the portion of inner cable 16f between the connection member 45 and the brake lever 12f, thus causing slack in the inner wire 16f. When this happens, the cable sleeve 23 is biased and moved by the coil spring 25 toward the base end (cable insertion side) of outer retainer 22 as shown by the chain line in FIG. 4. Consequently, the lever member 21 remains taut.

Figure 7A:
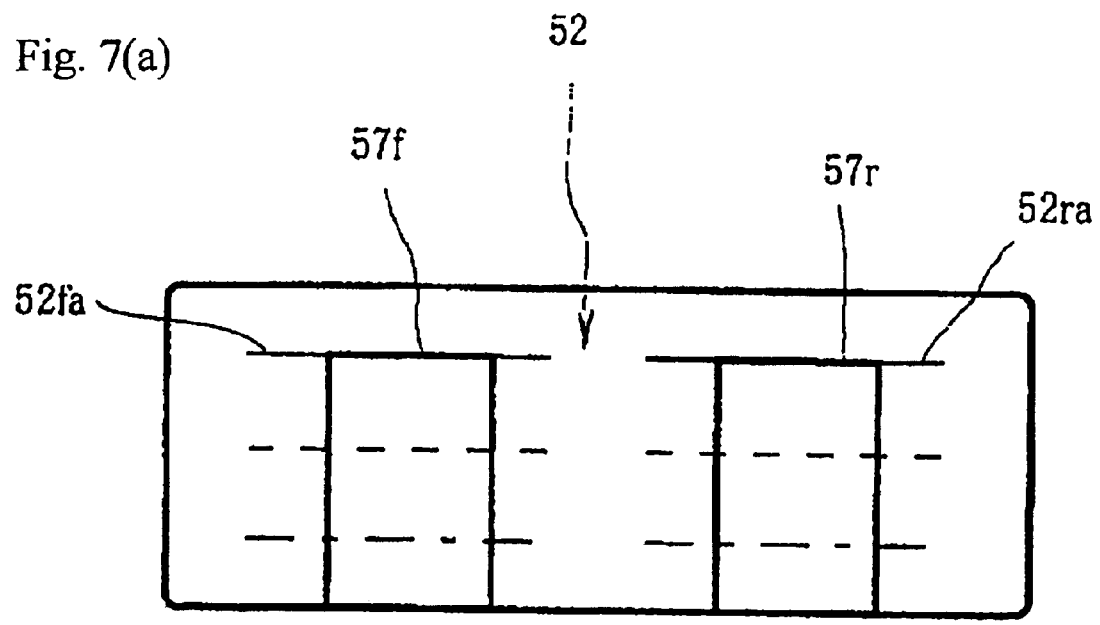
FIGS. 7(a) and 7(b) are a schematic views illustrating how play in the braking devices is confirmed.
Figure 7B:
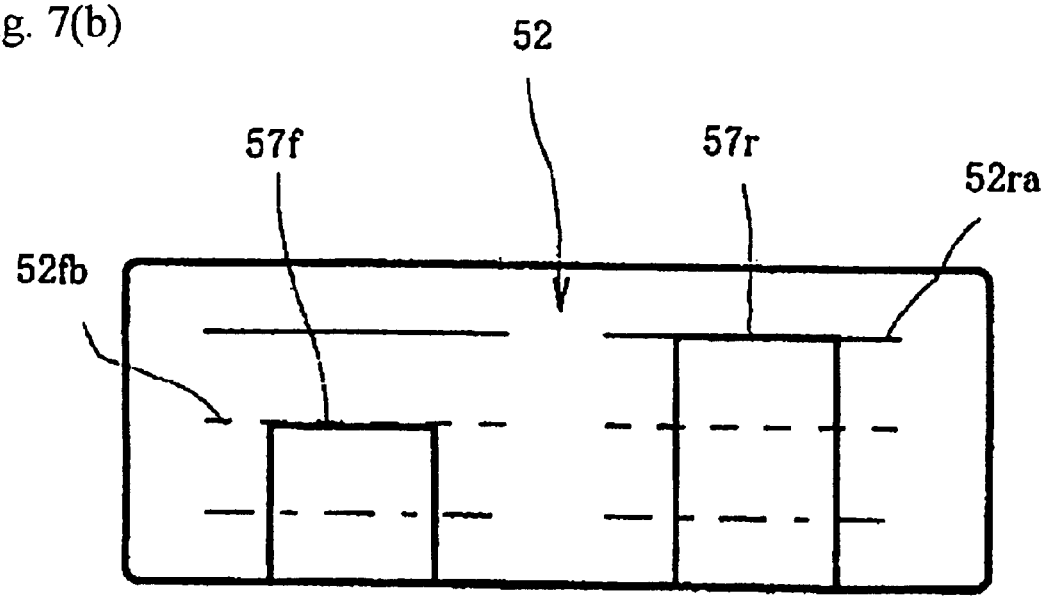

To adjust the play of braking devices 13f and 13r during manufacture or during routine brake adjustment, the knob components 54f and 54r of the confirmation knobs 51f and 51r are grasped, and the outer casings 17fb and 17rb are pulled toward the braking devices 13f and 13r. At that time, the play of the braking devices 13f and 13r can be visually confirmed by determining the position occupied by the bottom portions 57f and 57r of the indicators 53f and 53r on the graduation marks 52f and 52r. The play of the rear braking device 13r should be slightly reduced if the goal is to provide the front braking device 13f with a slower response than the one possessed by the rear braking device 13r. In this case, the play should be adjusted using play adjusting components 31f and 31r so that the bottom portion 57f of the indicator 53f for the front braking device 13f is aligned with the graduation mark 52fb shown by the broken line in FIG. 7, and so that the bottom portion 57r of the indicator for the rear braking device 13r is aligned with the graduation mark 52ra shown by the solid line in FIG. 7.

While the above is a description of various embodiments of the present invention, further modifications may be employed without departing from the spirit and scope of the present invention. For example, the size, shape, location or orientation of the various components may be changed as desired. Components that are shown directly connected or contacting each other may have intermediate structures disposed between them. The functions of one element may be performed by two, and vice versa. It is not necessary for all advantages to be present in a particular embodiment at the same time. Although the original embodiment was described with reference to a case in which roller-type internal expanding brakes for exerting a braking force on wheel hubs were used as the braking devices, such brakes may include band or disk brakes for exerting a braking force on hubs, or caliper or cantilever brakes for exerting a braking force on rims.

Figure 8:
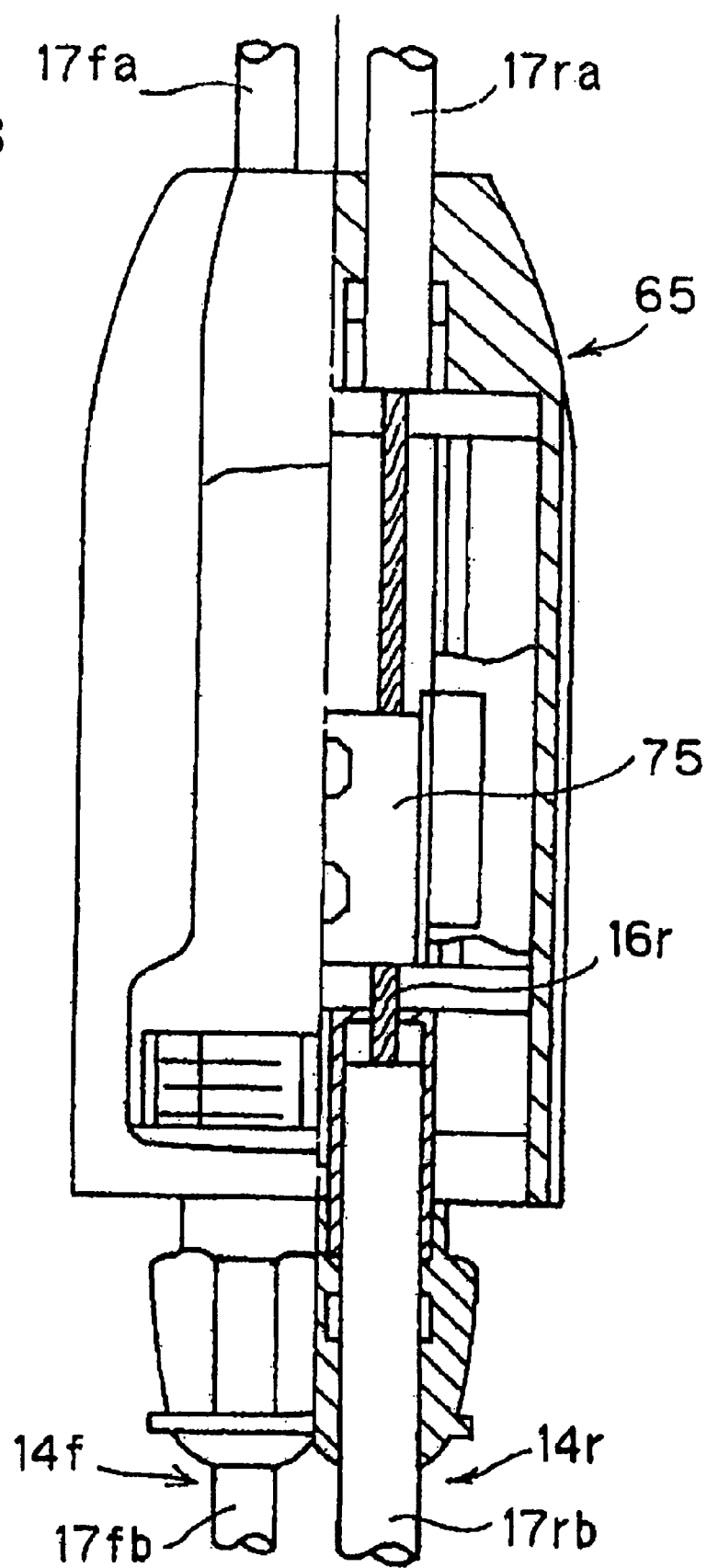
FIG. 8 is a partial cross sectional view of another embodiment of a cable connector according to the present invention.

Although the original embodiment was described with reference to a case in which coil springs 49 and 25 were mounted on the cable connector 15 and outer retainer 22, respectively, it is also possible to adopt an arrangement in which a coil spring is provided to either of the components, and the inner cable or the outer casing is biased in the direction in which the inner cable is exposed. FIG. 8 is a partial cross sectional view of another embodiment of a cable connector according to the present invention. The cable connector 65 shown in FIG. 8 is devoid of a coil spring for biasing a connection member 75. The rest of the structure is the same as in the above embodiment. In this structure, the gap between the brake cables 14f and 14r can be reduced in proportion to the absence of springs. A more compact cable connector 65 can therefore be designed.

Figure 9:
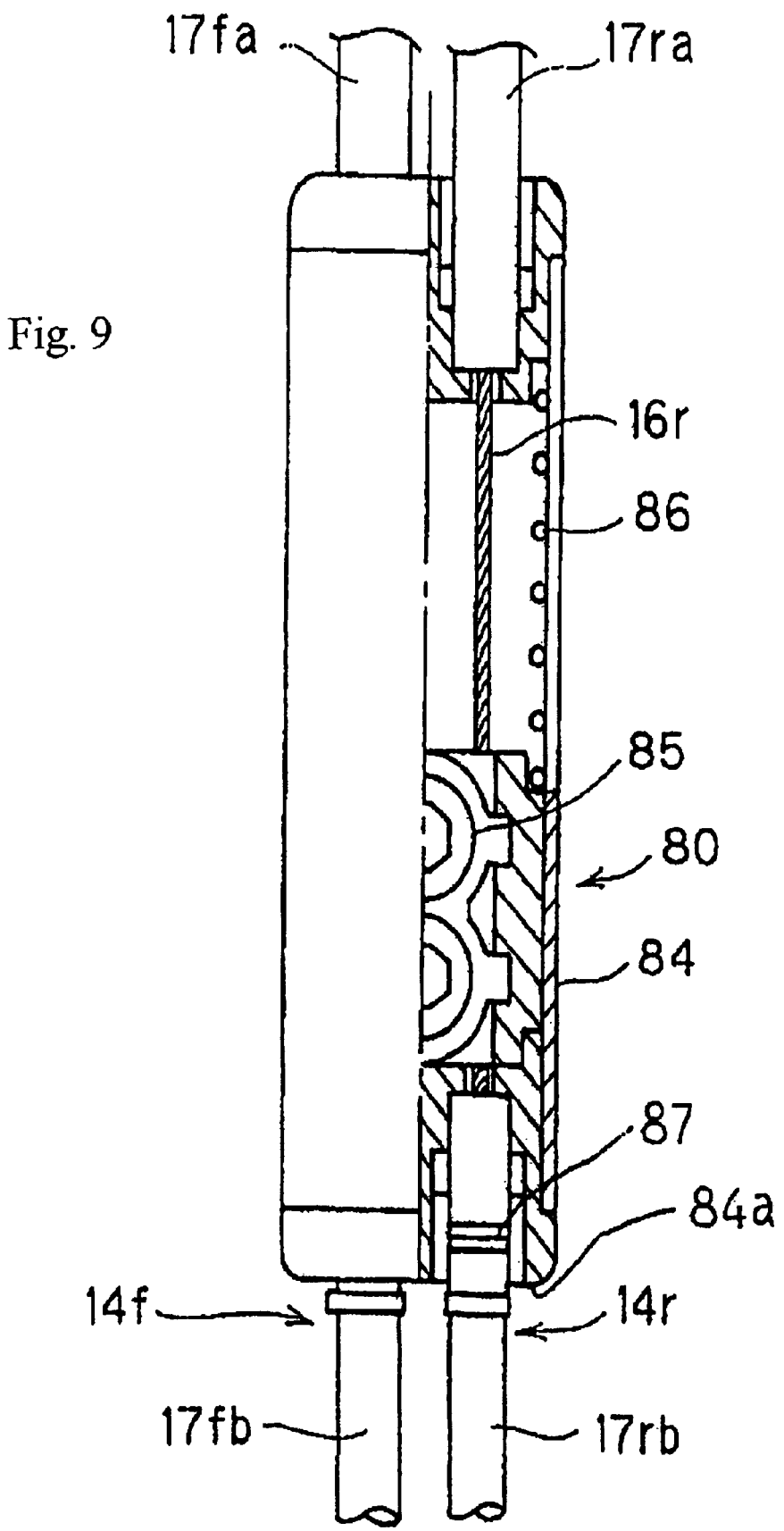
FIG. 9 is a partial cross sectional view of another embodiment of a cable connector according to the present invention.

Although the original embodiment was described with reference to a case in which separate brackets and casings were used, it is also possible to integrate the casings and brackets together. FIG. 9 is a partial cross sectional view of such an embodiment. In the cable connector 80 shown in FIG. 9, the cylindrical bracket 84 doubles as a casing, and the connection member 85 is mounted while allowed to move in the axial direction. In this case, the entire connection member 85 is biased by a single coil spring 86. In this embodiment, the outer casings 17fb and 17rb are provided with annular markings 87. Play should be adjusted such that the markings 87 reach a position beyond the bottom portion 84a of the bracket 84 when the outer casings 17fb and 17rb are pulled toward the braking device during play adjustment.

Figure 10:
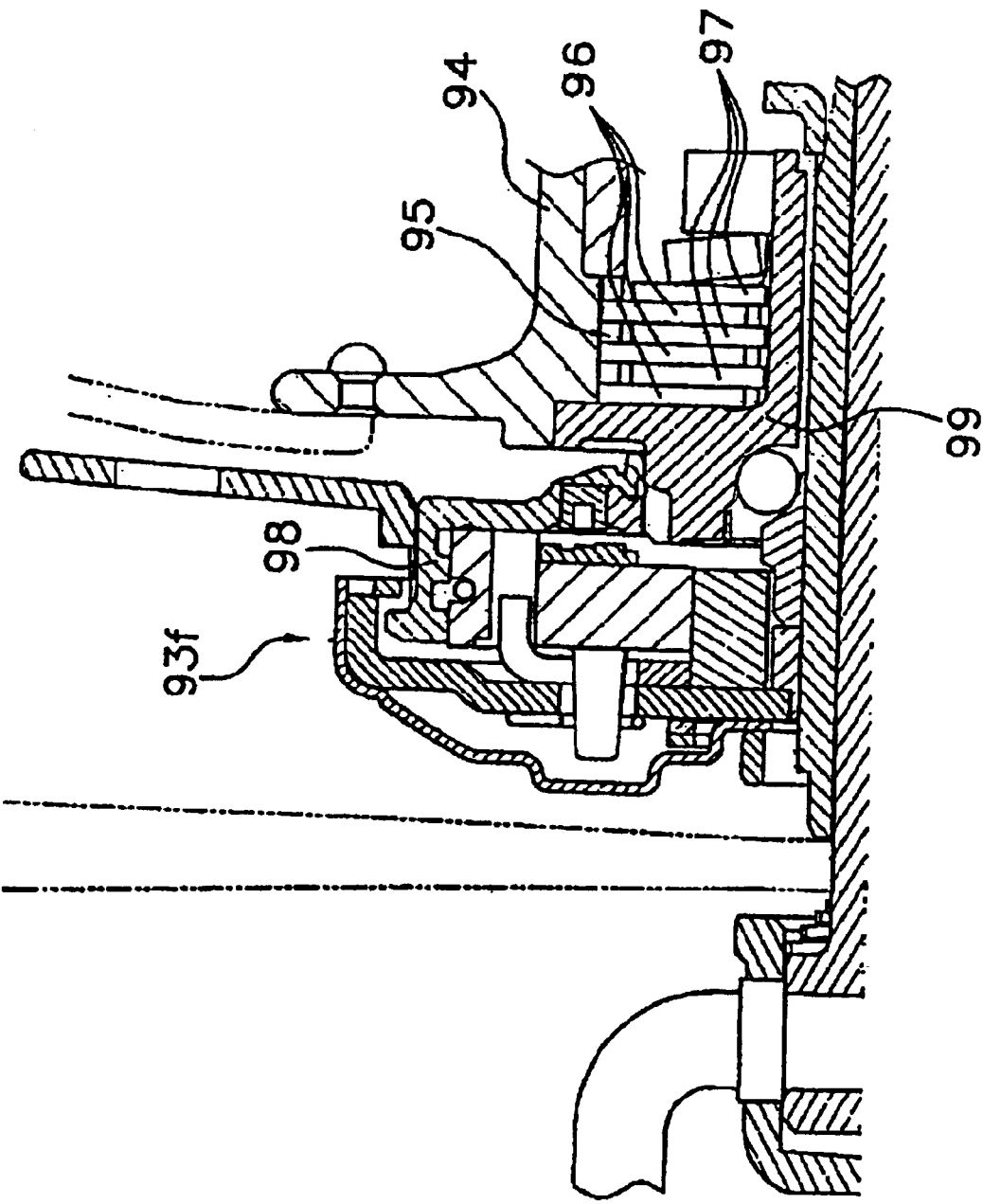
FIG. 10 is a cross sectional view of a braking device that includes a particular embodiment of a braking force modulator.

It is also possible to mount a modulator (brake force adjusting mechanism) capable of varying the braking force of one of the two front and rear braking devices 13f and 13r during braking. In FIG. 10, a modulator 95 is mounted inside a hub 94 connected to a front braking device 93f. The modulator 95 comprises washers 96 with retaining holes nonrotatably secured in the hub 94, and lugged washers 97 disposed between the washers 96 with retaining holes. The lugged washers 97 are secured in an annular cup 99 that rotates in conjunction with the rotary component 98 of the braking device 93f, and are caused to rotate in conjunction with the rotary component 98. The modulator 95 allows the rate at which the braking force increases with the operating force during braking to be reduced in accordance with the contact pressure of the two types of washers 96 and 97.

Although the original embodiment was described with reference to an arrangement in which the casing 48 was not fixedly mounted on the frame 1, it is also possible immovably mount the casing on the frame 1. Furthermore, although the above embodiment was described with reference to an arrangement in which the play confirmation mechanism was provided to the cable connector 15, it is also possible to provide the gauge to the front and rear braking devices 13f and 13r.

Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. An indicating apparatus for a control cable having an inner wire that slides within an outer casing comprising:

a guide adapted to receive the outer casing of the control cable so that the outer casing moves relative to the axial in an axial direction;

an outer casing retainer that supports the outer casing in an axially inward location relative to the guide in a rest position;

an indicator adapted to be retained to the outer casing of the control cable for movement therewith;

wherein the outer casing moves axially outward relative to the guide to operate the indicator; and a window for viewing the indicator.

2. An indicating apparatus for a control cable having an inner wire that slides within an outer casing comprising:

a guide adapted to receive the outer casing of the control cable so that the outer casing moves relative to the guide in an axial direction;

an outer casing retainer that supports the outer casing in an axially inward location relative to the guide in a rest position;

an indicator adapted to be retained to the outer casing of the control cable;

wherein the outer casing moves axially outward relative to the guide to operate the indicator; and indicia supported by the guide for cooperating with the indicator to indicate a position of the outer casing of the control cable.

3. The apparatus according to claim 2 wherein the indicia is disposed on a window.

* * * * *